Sept. 9, 1930.    O. PEARSON    1,775,211
FRICTION SHOE
Filed March 5, 1929

Inventor
Oscar Pearson
By his Attorneys
Williamson,
Reif & Williamson

Patented Sept. 9, 1930

1,775,211

UNITED STATES PATENT OFFICE

OSCAR PEARSON, OF MINNEAPOLIS, MINNESOTA

FRICTION SHOE

Application filed March 5, 1929. Serial No. 344,276.

This invention relates to an anti-slipping device to be used on the wheels of a vehicle and particularly to such a device in the form of a shoe adapted to embrace a tire and be secured to the rim. While the device is capable of being used with various types of vehicles, it is especially designed to be used on the modern automobile wheel. As is well known, automobiles often become mired or stuck in the mud or snow and some extra traction or friction is necessary in order for the automobile to be driven out of the mud or snow. It is undesirable to have chains or other anti-slipping devices constantly in use on the wheels and a device which can be easily placed on the wheel and removed therefrom is a great desideratum.

It is an object of this invention, therefore, to provide a simple and efficient friction shoe adapted to be secured to a vehicle wheel and one which can be easily and quickly secured in place and removed.

It is a further object of the invention to provide a friction shoe of partly circular shape or of general horse-shoe shape, one side of which has a section adapted to swing outwardly to enlarge the opening in said device, together with means for moving said section to clamp the ends of said device on the rim of a wheel.

It is a further object of the invention to provide a friction shoe of partly circular shape adapted to embrace the tire of an automobile wheel and have its ends over-lying the sides of the rim, one side of said device having a swinging section with means for moving said section inwardly to clamp the rim and hold the device in position.

It is more specifically an object of the invention to provide a friction shoe for an automobile wheel, of partly circular shape adapted to embrace a tire and engage the tread of the tire in its central portion, the sides having end portions disposed at the sides of the rim, one of said sides having a reduced portion with a slot extending lengthwise thereof and having a section embracing said reduced portion and carrying a pin movable in said slot, said portion having a cam surface formed thereon and said section having a cam mounted therein adapted to engage said cam surface to move said section inwardly, together with a handle which is movable to position to clamp said section and device on the rim and hold the same in clamped position.

These and other objects and advantages of the invention will be fully set forth in the following description made in connection with the accompanying drawings, in which like reference characters refer to similar parts throughout the several views and in which:—

Figure 1:
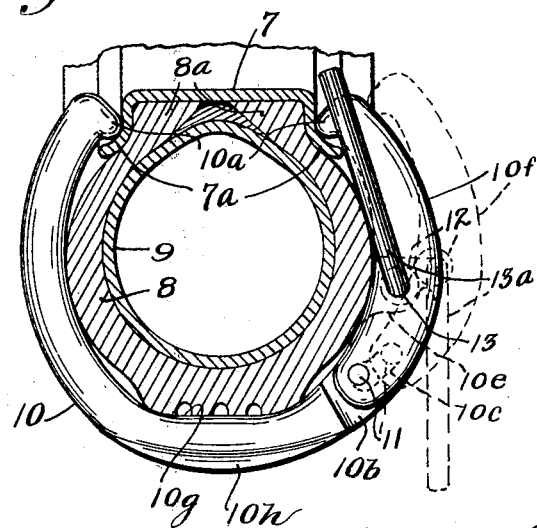
Fig. 1 is a view in radial section of an automobile wheel showing the device clamped thereto, parts being shown in different positions in dotted lines.
Figure 2:
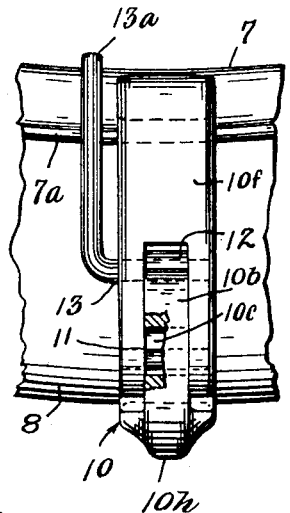
Fig. 2 is a view in side elevation as seen from the right of Fig. 1, some portions being broken away and others shown in vertical section.
Figure 3:
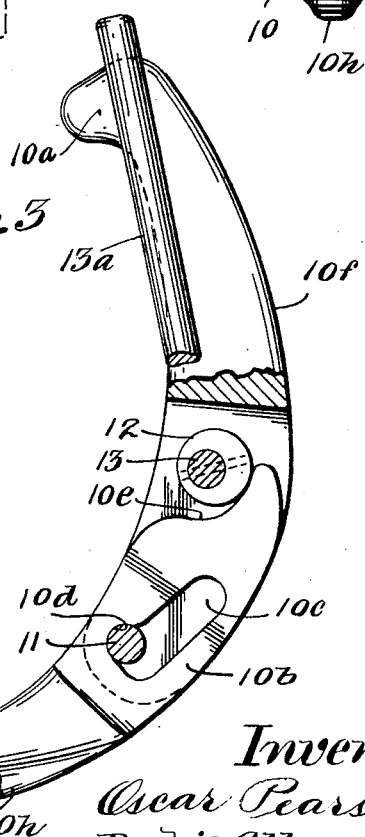
Fig. 3 is a view of one side of the device shown on an enlarged scale, some parts being broken away and others shown in vertical section.

Referring to the drawings, in Figs. 1 and 2 a portion of an automobile wheel is shown comprising a rim 7 having the usual outwardly curved side portions $7^a$, the tire casing 8 having the usual bead portions $8^a$ seated in the rim and the inner tube 9 of the tire. In accordance with the present invention a friction shoe 10 is provided which is of partly circular shape, or of general horse-shoe shape, the same having side portions adapted to extend about a tire, said side portions having projections $10^a$ at their ends extending inwardly and adapted to over-lie the sides $7^a$ of the rim. One side of member 10 has a reduced portion $10^b$ having an elongated slot $10^c$ extending substantially longitudinally thereof, said slot having a semi-cylindrical recess $10^d$ at one side adjacent its inner end. The portion $10^b$ is also formed at its inner side adjacent its end with a curved cam surface $10^e$. The portion $10^b$ is embraced by the lower end of a swinging section $10^f$ of member 10, which portion is bifurcated at its lower end and has a pin 11 secured therein and extending between the sides thereof, which extends through the slot 10$^c$. A cam 12 of cylindrical form is disposed between the side portions of section 10$^f$ and eccentrically secured to a pin 13 extending between and journaled in said side portions, said pin 13 extending at one side of member 10 and being bent at right angles to form the handle portion 13$^a$. It will be noted that the central portion of member 10 has a surface 10$^g$ of substantially flat formation adapted to engage the tread of the tire casing 8. It will also be noted that the outer side of the member 10 opposite surface 10$^g$ is formed with a central projecting rib 10$^h$.

Figure 4:
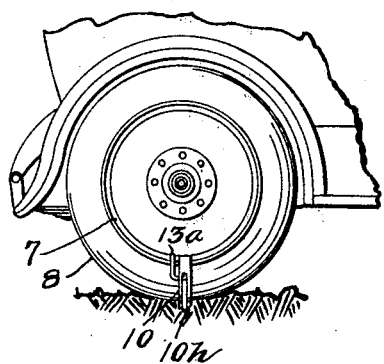
Fig. 4 is a view in side elevation showing a part of an automobile and the wheel thereof with the device secured to said wheel.

In operation when the shoe is detached and it is desired to attach the same to the wheel, the section 10$^f$ will be moved or pulled outwardly substantially longitudinally thereof, the pin 11 moving outward in slot 10$^c$ and cam 12 moving past the end of portion 10$^b$. Section 10$^f$ can then be swung outwardly and this greatly increases the opening between the end portions 10$^a$ of member 10. The device can then be moved radially inwardly over the tire and the portions 10$^a$ brought opposite to the sides 7$^a$ of the rim. Section 10$^f$ is then moved inwardly so that pin 11 seats in recess 10$^d$. At this time the handle 13$^a$ is swung so that the narrow portion of cam 12 outward of its pin 13 is adjacent the surface 10$^e$. With the device in this position and the portions 10$^a$ over-lying the sides of the rim, handle 13$^a$ is swung from the dotted line position shown in Fig. 1 to the full line position. This brings the wide portion of cam 12 against the surface 10$^e$, the cam tending to move portion 10$^b$ outwardly. As this portion is stationary, the cam re-acts to move portion 10$^f$ inwardly and clamp the rim very tightly between the portions 10$^a$. The handle 13$^a$ is movable slightly past the dead center position of the cam and the member 10 is thus firmly clamped or held on the rim and there is no tendency to separate the sides of said member or swing the handle 13$^a$ outwardly. The device is thus firmly secured in operative position as shown in Fig. 1, Fig. 2 and Fig. 4. In order to release and remove the device handle 13$^a$ is swung outwardly and downwardly from the position shown in Fig. 1 allowing section 10$^f$ to move outwardly sufficiently so that it can be moved lengthwise and then swung outwardly quite a distance. The device can then be readily withdrawn from the tire. It will be noted that when the device is in operative position the surface 10$^g$ engages the tread of tire 8. With the device clamped on a wheel the same will engage the supporting surface and furnish a great deal of extra traction to advance the vehicle when the wheel carrying rim 7 is driven.

From the above description it is seen that applicant has provided a very simple and efficient traction shoe and one which can be easily and quickly attached to and removed from a wheel. The parts of the device are quite few and the device can be easily and inexpensively manufactured, at the same time the device is quite rugged in construction.

The device has been amply demonstrated in actual practice and found to be very successful and efficient.

It will, of course, be understood that various changes may be made in the form, details, proportions and arrangement of the parts, without departing from the scope of applicant's invention, which, generally stated, consists in a device capable of carrying out the objects above set forth, in the novel parts and combinations of parts disclosed and defined in the appended claims.

What is claimed is:—

1. A friction shoe for a vehicle wheel, the same being of general horse shoe shape adapted to fit about the tire and engage the tread portion thereof at its central portion having in combination, a rigid member having a lug adapted to engage over the side of a wheel rim, and having an arm with a terminal portion reduced in thickness, a second member having a lug adapted to extend inwardly over the other side of said rim, said last mentioned member having a forked portion at its other end embracing said terminal portion, one of said portions having a slot therein extending substantially lengthwise thereof with a recess at one end, a pin on the other portion projecting into said slot, said last mentioned member having a shaft extending transversely therethrough, a cam on said shaft adapted to engage said terminal portion and a handle on said shaft for turning said cam to move said last mentioned member to clamp said shoe on the rim.

2. A friction shoe for a vehicle wheel the same being of general horseshoe shape adapted to fit about a tire and engage the tread portion thereof at its central portion, said shoe comprising a rigid member having an arm the terminal portion of which is adapted to engage over one side of a wheel rim, said member having a portion adapted to engage the tread of a tire, said member having another arm with the terminal portion formed as a cam surface, a second member having a terminal portion adapted to engage over the other side of said wheel rim and having its other end connected to said first mentioned member adjacent said last mentioned arm and constructed and arranged for swinging and longitudinal movement relative to said last mentioned arm and a cam carried by said last mentioned member constructed and arranged to act against said cam surface whereby said last mentioned member can be moved to have said cam clear said cam surface and means for moving said cam.

3. A friction shoe for a vehicle wheel, the same being of general horse shoe shape adapted to fit above a tire and engage a tread portion thereof at its central portion, said shoe comprising a clamping section having an arm, the terminal portion of which is adapted to engage over one side of a wheel rim, said section having an intermediate portion adapted to engage the tread of a tire, and having another arm reduced in thickness and provided with an inner terminal edge constituting a camming edge, a second clamping section having an outer terminal portion adapted to engage over the other side of said wheel rim and having a forked inner end straddling the reduced arm of said first clamping section and connected thereto for relative swinging movement, a camming cylinder eccentrically mounted in the forked end of said second clamping member and engageable with said cam edge, a handle for oscillating said camming cylinder to clamp said shoe to said rim, and means for effecting relative movement between said cam edge and said camming cylinder in a direction substantially lengthwise of said reduced arm so that said camming roller may clear said cam edge to permit extensive outward swinging movement of said second clamping member on said first clamping member.

In testimony whereof I affix my signature.

OSCAR PEARSON.